Jan. 4, 1966  J. C. HINKLE  3,227,480
FISH HOLDING DEVICE
Filed Sept. 25, 1963

INVENTOR
JOHN C. HINKLE
BY Dick & Zarley
ATTORNEYS

United States Patent Office 3,227,480
Patented Jan. 4, 1966

3,227,480
FISH HOLDING DEVICE
John C. Hinkle, 2939 Cornhusker Hiway, Lincoln, Nebr.
Filed Sept. 25, 1963, Ser. No. 311,511
4 Claims. (Cl. 294—16)

Fish holding devices are frequently used by fishermen as an aid in the process of cleaning fish. It is common knowledge that fish have the inherent characteristic of being slimy and difficult to hold securely. Many makeshift devices have been fabricated by fishermen in an attempt to devise a means whereby the fish may be securely held while said fish are being scraped or cleaned. Perhaps the most common methods of holding a fish are by means of pliers or by nailing the fish to a board. These devices are not satisfactory inasmuch as the pliers slip and the nail has a tendency to tear through the flesh of the fish.

Devices similar to that of the applicant have been devised to securely hold the fish. All of the devices presently on the market utilize saw teeth or the like as the securing means by which the fish is held in place. These devices have been generally unsatisfactory in that said saw teeth or the like have a tendency to tear through the flesh of the fish as did the nail device before them. In addition, these saw teeth have proven quite dangerous in that a severe cut is quite likely if the device slips and comes into contact with the fisherman. The tendency of the saw teeth to tear the flesh of the fish destroys or reduces the eating quality of the fish.

Therefore, the principal object of my invention is to provide a fish holding device which will effectively hold a fish in position for cleaning.

A further object of my invention is to provide a fish holding device which will not multilate the flesh of a fish while said fish is being cleaned.

A further object of my invention is to provide a fish holding device in which a fish may be easily inserted or removed.

A still further object of my invention is to provide a fish holding device which will eliminate the necessity of direct contact between a fisherman and the fish to be cleaned.

A still further object of my invention is to provide a fish holding device which will be safe to use by a person in cleaning fish.

A still further object of my invention is to provide a fish holding device that is economical of manufacture, durable in use, and refined in appearance.

Figure 1:
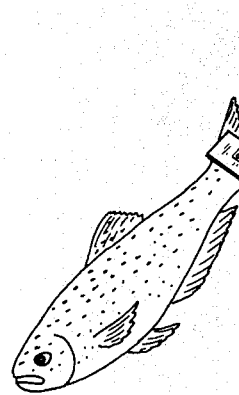
Figure 2:
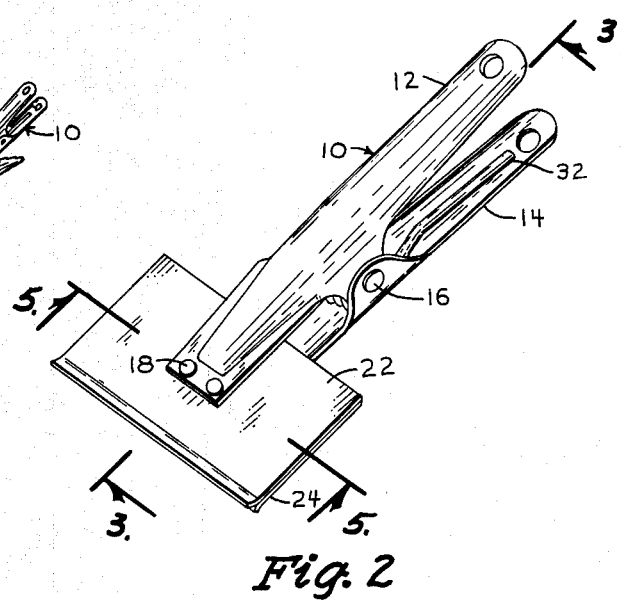
Figure 3:
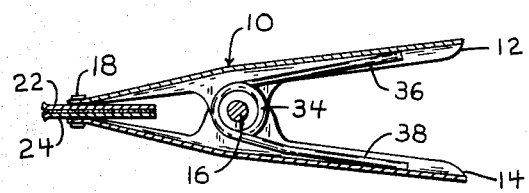
Figure 6:
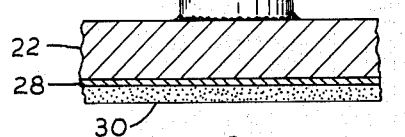
Figure 4:
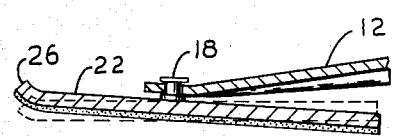
Figure 5:
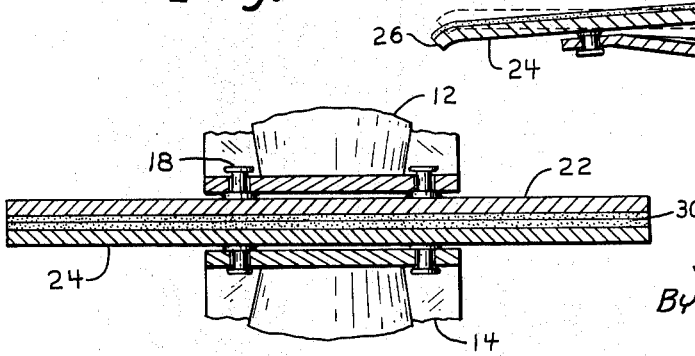

This invention consists in the construction, arrangements, and combination, of the various parts of the device, whereby the objects contemplated are attained as herinafter more fully set forth, specifically pointed out in the claims, and illustrated in the accompanying drawings, in which:

FIG. 1 is a perspective view of the device in operation;
FIG. 2 is a perspective view of the device;
FIG. 3 is a sectional view, at a reduced scale, of the device taken on line 3 of FIG. 2;
FIG. 4 is a partial sectional view, at an enlarged scale, illustrating the small amount of pivotal movement between the flat plates and the handle portions of the device;
FIG. 5 is a partial sectional view, at an enlarged scale, of the device taken on line 5 of FIG. 2; and
FIG. 6 is a partial sectional view, at an enlarged scale, illustrating the method by which the flat plates are secured to the handle portions.

I have used the numeral 10 to generally designate the handle portion of the device. Handle portion 10 includes movably secured handle portions 12 and 14 secured together by means of pin 16. Rivets 18 extend through bored holes 20 of handle portions 12 and 14 and are secured to superimposed flat plates 22 and 24 by any convenient means. Superimposed flat plates 22 and 24 include a slightly beveled edge 26 extending outwardly from handle portions 12 and 14, said edge 26 being at substantially a right angle to the longitudinal axis of handle portion 10. A layer of resilient material 28 is secured to the superimposed surfaces of plates 22 and 24 by any convenient means such as glue, etc. Coarse granular material 30 such as carborundum or the like is affixed to the outer surface of resilient material 28 by cementing or gluing or the like.

Spring 32 which comprises a central coil member 34 and spring arms 36 and 38 is secured between handle portions 12 and 14 by pin 16 which embraces central coil member 34. Spring arms 36 and 38 extend rearwardly of central coil members 34 and embrace the inner side of handle portions of 12 and 14 thereby yieldably normally holding flat plates 22 and 24 in a superimposed position.

The device is operated in the following manner: Spring 32 is compressed by squeezing handle portions 12 and 14 together thereby separating plates 22 and 24. The tail or any convenient portion of the fish is inserted between the separated superimposed plates 22 and 24. Beveled edge 26 allows easy placement of the fish between said plates 22 and 24. Spring 32 is released thereby bringing the plates 22 and 24 into contact with the fish to be cleaned. Said spring 32 yieldably normally resists inadvertent separation of said plates 22 and 24 thereby causing the fish to be securely held by the device. Rivets 18 which pass through bored holes 20 of the handle portions 12 and 14 are secured to plates 22 and 24 in such a manner to allow a small amount of pivotal movement between plates 22 and 24 and handle portions 12 and 14. This small amount of pivotal movement permits the plates 22 and 24 to automatically adjust and compensate for any variations in the shape or configuration of the body of the fish. Coarse material 30 which contacts the fish effectively "grasps" the fish and prevents the fish from slipping inadvertently from the device.

Thus, from the foregoing, it is seen that the device will accomplish all of its stated objectives.

Some changes may be made in the construction and arrangement of my Fish Holding Device without departing from the real spirit and purpose of my invention, and it is my intention to cover by my claims, any modified forms of structure or use of mechanical equivalents which may be reasonably included within their scope.

I claim:
1. In a fish holding device,
   two handle portions movably secured together,
   a flat plate secured to an end of each of said handle portions and adapted to be moved towards or away from each other when said handle portions are moved with respect to each other,
   a means to secure said flat plates to each of said handle portions, said securing means including at least two metal rivets passing through bored holes in each of said handle portions and secured to the associated plate by any convenient means,
   said bored holes being larger than the diameter of said rivets thereby allowing a small amount of pivotal movement between said handle portion and said flat plate,
   a means on said handle portions to yieldingly normally hold said plates in a superimposed position,
   and a coarse textured material affixed to the superimposed surfaces of each of said plates.
2. In a fish holding device,
   two handle portions movably secured together,
   a flat plate secured to an end of each of said handle portions and adapted to be moved towards or away from each other when said handle portions are moved with respect to each other, a means to secure said flat plates to each of said handle portions, said securing means including at least two metal rivets passing through bored holes in each of said handle portions and secured to the associated plate by any convenient means, said bored holes being larger than the diameter of said rivets thereby allowing a small amount of pivotal movement between said handle portion and said flat plate, a means on said handle portions to yieldingly normally hold said plates in a superimposed position, a layer of resilient material secured to the superimposed surfaces of said plates, and a layer of coarse textured material secured to the outer surface of said resilient material.

3. The structure of claim 2 wherein the means on said handle portions to yieldingly normally hold said plates in a superimposed position includes a spring.

4. The structure of claim 2 wherein said flat plates have a beveled outer edge, said outer edge substantially at a right angle to the longitudinal axis of said handle portions.

References Cited by the Examiner
UNITED STATES PATENTS 2,404,224   7/1946   Fink _____ 294—28

FOREIGN PATENTS 509,130   1955   Italy.

GERALD M. FORLENZA, *Primary Examiner.*

SAMUEL F. COLEMAN, *Examiner.*